United States Patent [19]

Sankaran et al.

[11] Patent Number: 5,434,215
[45] Date of Patent: Jul. 18, 1995

[54] WATER-BASED POLYMERIC EMULSIONS INCORPORATING WAX

[75] Inventors: Mahalingam Sankaran; Steven Y. Chan, both of Macungie, Pa.

[73] Assignee: Air Products and Chemicals, Inc., Allentown, Pa.

[21] Appl. No.: 259,647

[22] Filed: Jun. 14, 1994

[51] Int. Cl.$^6$ .............................................. C08L 91/00
[52] U.S. Cl. ..................... 524/763; 524/819; 524/822; 524/823; 524/832
[58] Field of Search ............... 524/763, 819, 822, 823, 524/832

[56] References Cited

U.S. PATENT DOCUMENTS

| | | | |
|---|---|---|---|
| 3,884,857 | 5/1975 | Ballard et al. | 260/28.5 AV |
| 4,942,193 | 7/1990 | Van Buskirk et al. | 524/276 |
| 5,081,174 | 1/1992 | Van Buskirk et al. | 524/277 |
| 5,229,450 | 7/1993 | Van Buskirk et al. | 524/487 |

OTHER PUBLICATIONS

Thankachan, Dr. Chacko, "Incorporation of Wax in Inks and Coatings" American Ink Maker (Oct. 1985) pp. 34–96.

Michelman, John S. and John B. Homoelle "Wax Emulsions in Aqueous Polymeric Coatings: Contributions and Mechanisms" Tappi Journal (Apr. 1989) pp. 159–163.

*Primary Examiner*—Paul R. Michl
*Assistant Examiner*—Edward J. Cain
*Attorney, Agent, or Firm*—Russell L. Brewer; Mary E. Bongiorno

[57] ABSTRACT

This invention relates to a method for forming an aqueous polymeric dispersion incorporating a wax. To form the aqueous dispersion, a polymer is formed by polymerizing at least one ethylenically unsaturated monomer under conditions for forming a polymer suspended in an aqueous medium in the presence of said wax. The polymerization of the monomer in the presence of a wax in finely divided form permits the formation of a stable dispersion having excellent properties. The surfactant system is a multiple system consisting of a nonionic and/or anionic surfactant and/or an alkali metal salt of a fatty acid ester.

16 Claims, No Drawings

WATER-BASED POLYMERIC EMULSIONS INCORPORATING WAX

FIELD OF THE INVENTION

This invention pertains to water-based polymeric emulsions particularly adapted for use in coatings and inks incorporating wax and to a method for preparing such emulsions.

BACKGROUND OF THE INVENTION

Waxes, which commonly are derived from natural and synthetic sources, have been incorporated into coating and ink systems for the purpose of altering surface properties such as gloss and water repellency in the resulting ink and coating. Waxes have been incorporated into aqueous coatings and ink formulations generally by four techniques. These technologies include molten wax, emulsification, dispersion, and micronization. The molten wax technique involves melting the wax in hot solvents having a boiling point higher than the melting point of the wax and dispersing the resultant mixture into the resin. Emulsified waxes are incorporated into aqueous systems through the use of dispersants and surface active materials to maintain stability. Dispersed waxes are generally produced by grinding the wax into a solvent and/or vehicle in a ball mill or roll mill. Micronized waxes are prepared by introducing the wax into a high-speed impeller and mixing with other components for forming a coating of ink.

There is a need for water based polymer containing emulsion, containing wax in graphic arts and coating industries. Some of the applications are in low moisture vapor barrier transmission (MVTR) coatings, barrier coatings and non-skid top coatings. The most prevalent method for incorporating waxes has been to disperse the wax into water and then add the aqueous wax dispersion to the emulsion or to the ink and coating formulations.

Emulsions having waxes incorporated by these methods are not without problems. These methods often limit the type and the amount of the wax that can be incorporated into aqueous emulsions and they often require substantial quantities of surfactants which can deter performance of the finished inks and coatings. These methods also, while achieving the desired outcome in terms of non-skid, low MVTR, often cause a reduction in gloss. Special equipment and techniques generally are required to incorporate the wax and consistency of the wax particle size and stability, without wax separation from the system or coagulation of latex particles, is very difficult to achieve.

The following patents and literature describe the utilization of waxes in formulating inks and coatings and methods of incorporation:

An article by Thankachan, "Incorporation of Wax and Inks and Coating: A Necessity and a Dilemma," American Ink Maker, pages 34–96 (October 1985), discloses the role of a variety of waxes in formulating coatings and inks. Typically, the waxes are incorporated into liquid inks and coatings, as a predispersed medium or stirred and milled into the ink or coating system.

Michelman, et al., "Wax Emulsions and Aqueous Polymeric Coating: Contributions and Mechanisms," Tappi Journal, pages 159–163 (April 1989), discloses the preparation of wax emulsions for use in aqueous polymeric coatings. The mix of emulsion and coating results in a substrate having a lower coefficient and friction, improved rub resistance, barrier properties, better release, better machinability, and the like. The article discusses various concentrations and types of wax and their effect on surface properties of the resultant coating.

U.S. Pat. Nos. 4,942,193; 5,081,174 and 5,229,450 disclose protective compositions based upon base-neutralized acid-functional copolymers incorporating a wax lubricant. The acid-functional copolymers are prepared by solution polymerizing ethylenically unsaturated monomers, e.g., acrylates, styrene and an acid-functional monomer, e.g., acrylic or methacrylic acid. The base-neutralized acid-functional polymer and wax lubricant is dispersed into water thereby forming an emulsion. Optionally, an additive to enhance removability of the coating from a surface is incorporated into the emulsion.

U.S. Pat. No. 3,884,857 discloses the production of ethylene/vinylester copolymers via solvent polymerization wherein molten petroleum, polyethylene and Fischer-Tropsch waxes are added to the polymerization medium.

SUMMARY OF THE INVENTION

This invention relates to an improved aqueous dispersion of a polymer of at least one polymerized ethylenically unsaturated monomer and a hydrophobic wax and an improved method for forming such aqueous polymeric dispersion or emulsion incorporating a hydrophobic wax. The aqueous dispersion is formed by:

a) forming an emulsion medium comprising water, stabilizing surfactant system, hydrophobic wax and at least one ethylenically unsaturated monomer;

b) effecting emulsion polymerization of the ethylenically unsaturated monomer in the presence of said wax.

Preferably the hydrophobic wax is first dispersed or emulsified in an aqueous medium and the ethylenically unsaturated monomer delay added to the aqueous medium and polymerized. Advantageously, a multiple stabilizing surfactant system for maintaining stability of the latex particles and for maintaining stability of the wax is incorporated into the aqueous medium for facilitating dispersion of the hydrophobic wax, said multiple surfactant system comprising a nonionic surfactant or anionic surfactant system and/or an alkali metal salt of a fatty acid ester.

There are several advantages associated with the aqueous dispersion or polymeric emulsion-containing wax produced herein, and these include:

(a) an ability to form an emulsion-containing a polymeric component dispersed therein accompanied with wax which is shelf stable;

(b) an ability to prepare an emulsion containing a polymeric component and wax which can be rendered freeze-thaw stable;

(c) an ability to form an aqueous polymeric emulsion incorporating wax without suffering from a lack of stability, inconsistent particle size, phase separation, particle coagulation, etc.;

(d) an ability to form an aqueous polymeric dispersion incorporating wax without substantial detraction in gloss when applied as top coatings; and (e) an ability to achieve desired properties in coatings at low levels of wax incorporation.

DETAILED DESCRIPTION OF THE INVENTION

The invention relates to an aqueous dispersion, i.e., an emulsion containing a polymeric component formed by the emulsion polymerization of at least one ethylenically unsaturated monomer in the presence of a hydrophobic natural or synthetic wax. As noted in the background of the prior art, one of the primary problems associated with emulsion polymers containing wax is that of particle coagulation. The presence of the wax often interferes with the stability of the latex particles. At low wax levels, stability may be acceptable, but performance also may be poor. In an effort to achieve better performance, e.g., moisture resistance, it became necessary to increase the wax level, but in so doing the emulsion became less stable. In solvent polymerized systems, wax incorporation and stability was not a problem. In aqueous systems the problem was more acute. It has been found that excellent dispersion can be obtained by first dispersing or emulsifying the wax in an aqueous medium, then incorporating polymerizable monomer in the aqueous medium and then carrying out the polymerization of the ethylenically unsaturated monomers.

Emulsion polymerization of ethylenically unsaturated monomers is a well-known process. In emulsion polymerization ethylenically unsaturated monomers are distributed within an aqueous medium containing, inter alia, a polymerizable monomer, stabilizer and free radical initiator. Monomers suited for emulsion polymerization are ethylenically unsaturated monomers which include esters of acrylic and methacrylic acid, i.e., the reaction product of acrylic and methacrylic acid and $C_1$–$C_{12}$ alcohols. These include methylmethacrylate, ethylmethacrylate, butylmethacrylate, ethylhexylacrylate, methylacrylate, ethylacrylate, butylacrylate, octylacrylate and the corresponding hydroxyalkylacrylates such as hydroxyethyl acrylate. Vinyl esters of $C_2$–$C_5$ carboxylic acids such as vinyl acetate and vinyl propionate, acrylonitrile, styrene, alpha-methylstyrene, butadiene; and olefinically unsaturated $C_3$–$C_6$ carboxylic acid containing monomers, such as acrylic and methacrylic acid, fumaric acid, maleic acid and olefin monomers, such as ethylene and propylene can also be used. Generally, the resultant polymer comprises one or more of the above listed monomers, e.g., a copolymer of vinyl acetate and an acrylate or a copolymer of ethylene or styrene and an acrylate. For purposes of generating coatings and inks, acrylic and methacrylic acid esters of $C_1$–$C_6$ alcohols along with a small fraction of a carboxylic acid component is used. Typical preferred monomers for inks and coatings will comprise the following monomeric components:

a) from about 0 to 95% by weight of a $C_{1-8}$ alkyl ester of acrylic or methacrylic acid or vinyl acetate;
b) from about 0 to 20% by weight of an unsaturated carboxylic acid such as acrylic acid, methacrylic acid or crotonic acid;
c) from about 0 to 80% by weight of a monomer selected from the group consisting of ethylene, propylene, styrene, butadiene, and acrylonitrile.

Vinyl acetate-ethylene emulsions and styrene/acrylate emulsions are particularly well suited for use in formulating inks and coatings and typical vinyl acetate formulation will contain from about 50 to 85% by weight vinyl acetate, 5–15% ethylene, and 0–10% of a third monomer. A typical acrylate formulation will comprise a $C_{1-6}$ alkyl ester of acrylic or methacrylic acid, 0 to 70% styrene, and 0 to 10% of a third monomer. Usually the third monomer is a functional monomer, e.g., a monomer providing hydroxyl, carboxyl or amino activity.

Emulsion polymerization of the monomers is carried out in the presence of water and a stabilizing system which may include protective colloids such as polyvinyl alcohol and hydroxyethyl cellulose or nonionic and anionic surfactants. Also emulsion polymerization may be carried in the presence of soaps which include alkali metal salts out of fatty acids, e.g., sodium stearate, sodium laurate, potassium laurate, and potassium oleate; and alkyl sulfonates such as sodium lauryl sulfonate.

Nonionic surfactants which can be used to stabilize the emulsion as well as enhance performance in the end use application include polyoxyethylene condensates, e.g., polyoxyalkylene ethers and esters. These are widely used for emulsion polymerization. Examples include polyoxyethylene nonylphenyl ether, polyoxyethylene octyl phenyl ether, and polyoxyethylene laurate ether. The polyoxyethylene esters of higher fatty acid esters, e.g., those having from about 14 to 18 carbon atoms, include polyoxyethylene laurate. Other examples are noted in U.S. Pat. 3,844,990 and are incorporated by reference.

Acid functional polymers can also be used as a component of the stabilizing system. These acid functional polymers typically are polymers comprising vinyl acetate or an acrylate and a monomer providing pendant carboxyl functional groups. Acid functional polymers generally have an acid value of 130–300 and a molecular weight of 1,000–20,000. Preferably they have acid value of 210 and a molecular weight of 5,000.

The polymerization of ethylenically unsaturated monomers in an aqueous medium is generally carried out using free radical catalysts. A variety of free radical initiator systems can be used which include thermally generated free radical initiation systems such as those based upon ammonium persulfate, sodium persulfate and the like, and reduction/oxidation (redox) systems. Examples of redox systems include t-butyl hydroperoxide and sodium formaldehyde sulfoxylate reducing agent, or hydrogen peroxide, and the reducing agent, etc. Suitable amounts of oxidizing agent for emulsion polymerization range from about 0.01 to 3% by weight. The reducing agent is ordinarily added in the necessary equivalent amount for the reduction/oxidation reaction.

Reaction conditions used for effecting emulsion polymerization of the monomers in the presence of wax are conventional with the temperatures ranging typically from about 20° C. 90° C. and pressures ranging from about atmospheric to about 1500 psig. Polymerization times will range from about 1 to 6 hours. Preferably the polymerization is carried out at elevated temperatures, e.g. within 10% of the melting point of the wax. This permits the wax to soften thereby promoting dispersion and incorporation into the emulsion.

A variety of waxes can be incorporated into the aqueous dispersion during polymerization. These waxes are hydrophobic and essentially water insoluble. The major types of waxes are:

1) Natural waxes which are extracted from vegetables (Carnauba wax, Japan wax, Bayberry wax) or animals (Beeswax, Shellac wax, Spermaceti wax);
2) Mineral waxes, extracted from bituminous lignite or share (Montan wax, Ozokerite wax, Ceresin wax);

3) Petroleum waxes, complex mixtures of paraffinic hydrocarbons obtained from the tailings in the distillation of crude petroleum (Paraffin wax), or by dewaxing heavy lubricating oils and petrolatum residues (microcrystalline wax);

4) Synthetic waxes, made by chemical processes including petroleum, Fischer-Tropsch (by coal gasification), polyethylene, polypropylene, fatty acid amides, and polytetrafluoroethylene waxes.

Of these the petroleum and polyethylene waxes are preferred for incorporation into the aqueous emulsion.

The amount of the wax included in the aqueous emulsion as a weight percentage on the emulsion generally is from about 0.05%–10%. Typically, the system will comprise from 0.5–2% by weight of the emulsion. The optimum level of wax depends on the combination of the polymer, wax type and the performance requirements. Generally when lower levels of wax are used, they will not meet the performance requirements. Higher levels tend to have stability problem and may detract in gloss.

To incorporate the hydrophobic wax into the emulsion medium for polymerization it is best to first form a wax dispersion or emulsion comprising the hydrophobic wax and stabilizing surfactant system and then delay addition of the ethylenically unsaturated monomers to the wax containing dispersion. In order to disperse the wax, and maintain stability of the polymeric component in the emulsion, a stabilizing surfactant system is utilized which generally includes alkali metal salts of fatty acids and non-ionic or anionic surfactants. A preferred component of the surfactant system is an alkali metal salt of a fatty acid ester, the fatty acid having from 14–22 carbon atoms. Examples include sodium and potassium stearate, and sodium and potassium laurate, etc. These fatty acid esters act to stabilize the resulting emulsion. Examples of non-ionic surfactants include alkoxylated derivatives of higher aliphatic ($C_{6-15}$) alcohols, such as the ethoxylated derivatives of nonyl phenol, dodecyl alcohol, etc. Examples of anionic surfactants include alkyl and dialkyl sulfosuccinates, sulfates, sulfonates, sarcosinate, sulfonic acids and phosphates, etc. Each may be used by the formulation specialist to generate the performance required in the end use application.

The following examples are provided to illustrate various embodiments of the invention and are not intended to restrict the scope thereof.

EXAMPLE 1

Styrene/Butyl Acrylate Emulsion Containing Wax

Emulsion polymerization of unsaturated monomers in the presence of a synthetic wax from a formulation comprising an initial charge and feeds was carried out as follows:

| Initial charge | | |
|---|---|---|
| Vancryl 65[1] | 180.0 | grams |
| Sodium Stearate | 14.0 | grams |
| Deionized Water | 914.0 | grams |
| Ross Wax 145[2] | 28.0 | grams |
| Total | 1136.0 | |
| Feeds | | |
| 1. 28% ammonium hydroxide | 58.0 | grams |
| 2. Ammonium persulfate (APS) | 9.0 | grams |
|     Deionized water | 183.0 | grams |
| 3. Styrene | 353.0 | grams |
|     Butyl Acrylate (BA) | 367.0 | grams |
| 4. t-Butyl Hydroperoxide | 3.6 | grams |

| | | |
|---|---|---|
| | Deionized Water | 22.5 grams |
| 5. | Erythorbic Acid | 1.8 grams |
| | Deionized Water | 22.5 grams |
| | Dimethyl ethanolamine | 1.8 grams |
| | Total | 1022.2 |

[1]Vancryl 65 is a trademark used to identify a copolymer formed by polymerizing styrene, alpha-methyl styrene and acrylic acid.
[2]Ross Wax 145 is a polyethylene wax having a melting point of about 145° F.

In preparing the emulsion, an initial charge was found by predispersing wax in an aqueous medium. The wax was stabilized through the use of carboxyl containing polymer and sodium stearate. The initial charge containing the wax was added to a two liter glass reactor under an inert gas atmosphere, the contents were heated to 80° C. with agitation, the temperature being higher than the melting point of the Ross wax. Ammonium hydroxide solution was added over 20 minutes during the heat up to 80° C. An initiator mix comprising ammonium persulfate and water was started when the contents reached 78°–80° C. and then added continuously over three hours and fifteen minutes. A monomer delay of styrene and butyl acrylate was started five minutes after addition of the initiator and added over three hours. After the delay feeds of initiator and monomer had been added to the reactor, the reaction was held at 80° C. for one hour and then cooled to 50° C. A chase catalyst (feeds no. 4 and 5) were added to the reactor to remove residual monomer which was accomplished by maintaining the reactor contents at temperature for an additional hour. The reaction or contents were cooled to room temperature and filtered through a 150 micron bag. The physical properties of the resultant emulsion are as follows.

| | |
|---|---|
| % Non volatiles | 42.8 |
| Viscosity (cps) | 226 |
| pH | 8.2 |
| Grit (ppm) | 5 |
| % Free monomer | None detected |

From the above data it is noted that there is little grit. This wax containing emulsion was freeze thaw stable and the wax did not separate out on aging.

EXAMPLE 2

Coating Evaluation

Coatings were prepared comparing the Example 1 emulsion which contained Ross wax polymerized therein to an emulsion essentially identical to the Example 1 emulsion except that it did not contain Ross Wax 145. Each emulsion was applied with a #4 Meyer rod on SUS paper board and dried at 80° C./15 sec. Results are as follows:

| | Emulsion | |
|---|---|---|
| | Example #1 | Example 1 emulsion Without Ross Wax 145 |
| 60° C. Gloss | 44 | 44 |
| Coefficient of friction (ASTM D4518-87 Method A) | 15° | 40° |
| Scratch Resistance (best = 10, worst = 0) | 8 | 3 |

Coatings or top lacquers made from the wax containing emulsion exhibited water repellent properties; the non-wax containing systems did not. Also, the coefficient of friction was much lower with polymerized wax containing emulsion than the emulsion not containing wax.

EXAMPLE 3

Styrene/Acrylate Carnauba Wax Emulsion

The procedure of Example 1 was repeated essentially except that carnauba wax was utilized in place of the Ross wax and the formulation adjusted slightly.

| Initial Charge | | | |
|---|---|---|---|
| Vancryl 65 | | 180.0 grams | |
| Deionized Water | | 913.5 grams | |
| Sodium Stearate | | 14.0 grams | |
| Carnauba Wax | | 28.0 grams | |
| Feeds | | | |
| Base | | | |
| 28% Ammonium hydroxide | | 54.0 grams | |
| Catalyst | | | |
| Ammonium persulfate | | 3.0 | |
| Deionized Water | | 30.0 | |
| Catalyst Delay | | | |
| Ammonium persulfate | .815 g/min | 6.0 | |
| Deionized Water | 195 min | 153.0 | |
| Monomer Delay #1 | | | |
| Styrene | 4 g/min 115 min | 92.0 | |
| BA | | 367.0 | |
| Monomer Delay #2 | | | |
| Styrene | 4 g/min 65 min | 261.0 | |
| Chase Catalyst | | | |
| Erythorbic Acid | | 1.8 | |
| Dimethyl ethanolamine | | 1.8 | |
| Deionized Water | | 22.5 | |
| Chase Catalyst | | | |
| t-Butyl Hydroperoxide 70% | | 3.6 | |
| Deionized Water | | 22.5 | |

After a period of about 45 minutes the wax in the initial charge began to separate thus showing instability. But, when introduced to the emulsion medium and polymerized the polymer was formed the emulsion was stable. With the wax incorporated into the emulsion during polymerization, one eliminates the incompatibility problem. Particle size of the wax can also be better controlled in this manner and high gloss is maintained.

EXAMPLE 4

Preparation of Styrene/Butyl Acrylate Polymer

The procedure of Example I was repeated except for substitution of the following initial charge incorporating additional nonionic surfactants and catalyst systems.

| Initial Charge | | |
|---|---|---|
| Vancryl 65 | 202.36 grams | |
| Aerosol OT-75% | 12.26 grams | |
| ALIPAL CO-436 | 14.77 grams | |
| Sodium Stearate | 14.00 grams | |
| Ross Wax 145 | 28.00 grams | |
| Deionized water | 706.5 grams | |
| Feeds | | |
| Base | | |
| 28% Ammonium hydroxide | 58.00 grams | |
| Catalyst | | |
| APS | 7.24 | |
| Deionized Water | 30.00 | |

| -continued | | | |
|---|---|---|---|
| Monomer Delay | | | |
| Styrene | | 575.52 | |
| Butyl Acrylate | 4.38 g/min | 55.26 | |
| ALIPAL CO-436 | 150 min | 26.55 | |
| Chase Catalyst | | | |
| Erythorbic Acid | | 1.8 | |
| Dimethyl ethanolamine | | 1.8 | |
| Deionized Water | | 22.5 | |
| Chase Catalyst | | | |
| t-Butyl Hydroperoxide 70% | | 3.6 | |
| Deionized Water | | 22.5 | |

The resulting emulsion has good stability and imparts excellent properties in terms of gloss and moisture resistance to inks and coatings.

EXAMPLE 5

Preparation of Styrene/Ethylhexyl acrylate Emulsion

The procedure of Example 1 was repeated except for the substitution of the following charge and procedure.

| Initial Charge | | |
|---|---|---|
| Vancryl 65 | | 171.18 grams |
| Deionized Water | | 410.04 grams |
| Aerosol OT-75% | | 17.10 grams |
| Sodium Stearate | | 14.00 grams |
| Ross Wax 145 | | 28.00 grams |
| Deionized Water (Rinse) | | 25.20 grams |
| Feeds | | |
| Base | | |
| 28% Ammonium hydroxide | | 48.60 grams |
| Deionized Water (Rinse) | | 17.10 grams |
| Catalyst | | |
| Ammonium persulfate | | 9.18 |
| t-Butyl Hydroperoxide 70% | | 2.34 |
| Deionized Water | | 37.80 |
| Monomer Delay #1 | | |
| 2-Ethylhexyl Acrylate | | 425.52 |
| Styrene | 4.63 g/min | 252.00 |
| ALIPAL CO-436 | 150 min | 19.00 |
| Monomer Delay #2 | | |
| Methacrylic Acid (MAA) | | 27.36 |
| 28% Ammonium hydroxide | | 20.70 |
| Deionized Water | | 222.66 |
| Chase Catalyst | | |
| Erythorbic Acid | | 3.6 |
| Dimethyl ethanolamine | | 3.6 |
| Deionized Water | | 38.34 |
| Chase Catalyst | | |
| t-Butyl Hydroperoxide 70% | | 7.20 |
| Deionized Water | | 38.34 |

Viscosity 129 cps, 1 v #2, rpm 60, T = 22° C., pH 8.13, 44.19%, adjusted pH to 8.61, 4.5 g of 28% ammonium hydroxide was added. Viscosity 435 cps. 1 v #2, rpm 60, T = 23° C., 44.16%.

The resulting wax exhibited excellent stability and imparts excellent properties, e.g., moisture resistance to inks and coatings.

EXAMPLE 5

Comparison of Microdispersed Wax in Preformed Polymer Emulsion vs Emulsion Containing Polymerized Wax A predispersed wax formulation was prepared by mixing 90 weight parts of an acid funcional acrylic resin solution at 30% solids, such resin sold under the trademark, Vancryl 68S with 10 parts by weight wax sold under the trademark, Rosswax 145. The wax was melted first and then added to the emulsion and mixed therein. Eighty five parts by weight of the Example 1 emulsion not containing wax and 15 parts of the predispersed wax formulation were mixed thereby generating formulation A.

A second formulation (formulation B) was prepared by mixing 85 parts by weight of the Example 1 emulsion containing the wax polymerized therein was mixed with 15 parts of the Vancryl 68S acrylic acid solution. Thus, the only difference between formulation A and formulation B was in the method of incorporating the wax.

Each emulsion was coated onto SUS paper board with a #4 Meyer rod and dried at 80° C. for 15 seconds.

| Results | Fomulation A | Fomulation B |
|---|---|---|
| Contact Angle | 72.2 | 96.2 |
| 60° Gloss | 35.6 | 46.3 |

The above results clearly indicate that the Example 1 formulation containing the wax polymerized therein with the monomers is much better than the emulsion having the wax dispersed therein after polymerization. The higher contact angle shows better water repellency and the higher gloss number shows better gloss.

What is claimed is:

1. In an aqueous polymeric dispersion comprising water, a polymer formed by the polymerization of at least one ethylenically unsaturated monomer and a hydrophobic wax, the improvement in said aqueous polymeric dispersion which comprises;
   a) said dispersion formed by emulsion polymerization of a medium comprising water, hydrophobic wax, at least one ethylenically unsaturated monomer and stabilizing surfactant system under emulsion polymerization conditions, and
   b) said emulsion polymerization carried out in the presence of said hydrophobic wax.

2. The aqueous polymeric dispersion of claim 1 wherein the polymer is formed by the polymerization of an ethylenically unsaturated monomer selected from the group consisting of esters of acrylic and methacrylic acid and $C_1$-$C_{12}$ alcohols, hydroxyalkylacrylates, vinyl esters of $C_2$-$C_5$ carboxylic acids, acrylonitrile, styrene, alpha-methylstyrene, and butadiene.

3. The aqueous polymeric dispersion of claim 2 wherein the hydrophobic wax is first dispersed in an aqueous medium, the ethylenically unsaturated monomer incorporated with the resulting dispersion and polymerization effected.

4. The aqueous polymeric dispersion of claim 1 wherein the stabilizing surfactant system comprises a polymer incorporating carboxyl functionality and alkali metal salt of a fatty acid.

5. The aqueous polymeric dispersion of claim 4 wherein the wax is a petroleum or polyethylene wax and is incorporated in an amount of from 0.05 to 10% by weight.

6. The aqueous polymeric dispersion of claim 5 wherein at least one of the ethylenically unsaturated monomers comprised in the emulsion medium is selected from the group consisting of $C_{1-6}$ alkyl esters of acrylic or methacrylic acid, vinyl acetate and styrene.

7. The aqueous polymeric dispersion of claim 6 wherein the ethylenically unsaturated monomer comprises 50–85% by weight of vinyl acetate, 5–15% ethylene, and 0–10% of a third monomer.

8. The aqueous polymeric dispersion of claim 5 wherein the ethylenically unsaturated monomer comprises from a $C_{1-6}$ alkyl ester of acrylic or methacrylic acid, 0–70% styrene and 0–10% of a third monomer.

9. In a process for forming an aqueous polymeric dispersion having a hydrophobic wax incorporated therein, the improvement for incorporating said wax into said aqueous polymeric dispersion which comprises effecting polymerization of an emulsion medium comprising at least one ethylenically unsaturated monomer under emulsion polymerization conditions in the presence of said hydrophobic wax and in the presence of a stabilizing surfactant system comprising an anionic, nonionic surfactant or an alkali metal salt of a fatty acid ester.

10. The process of claim 9 wherein the hydrophobic wax is selected from the group consisting of synthetic and petroleum waxes.

11. The process of claim 10 wherein the hydrophobic wax is first predispersed in an aqueous medium containing the stabilizing surfactant system, the ethylenically unsaturated monomer then incorporated with the aqueous medium and polymerized.

12. The process of claim 11 wherein the stabilizing surfactant system comprises an alkali metal salt of a fatty acid ester as a dispersion aid.

13. The process of claim 12 wherein the alkali metal salt of a fatty acid is sodium stearate.

14. The process of claim 12 wherein the stabilizing surfactant system comprises an emulsion stabilizing polymer having pendant acrylic or methacrylic acid functionality.

15. The process of claim 14 wherein the ethylenically unsaturated monomer comprises 50–85% by weight vinyl acetate, 5–15% ethylene and 0–10% of a third monomer.

16. The process of claim 10 wherein the ethylene unsaturated polymer is formed from a $C_{1-6}$ alkyl ester of acrylic and methacrylic acid, 0–70% styrene by weight, and 0–10% of a third monomer.

* * * * *